(12) United States Patent
Proefke et al.

(10) Patent No.: US 6,386,447 B1
(45) Date of Patent: May 14, 2002

(54) SMART CARD WITH CARD IN VEHICLE WARNING

(75) Inventors: David T. Proefke, Madison Heights; Thomas E. Utter, Royal Oak; Robert C. Baillargeon, Utica; Thomas W. Pfeffer, Rochester; Jeffrey R. Coil, Milford; Andrew C. Brenz, Lake Orion; Kenneth P. Orlando; Tejas B. Desai, both of Sterling Hghts; Christian O. Johnson; Ronald J. Plichta, both of Rochester Hills, all of MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/678,684

(22) Filed: Oct. 3, 2000

Related U.S. Application Data

(60) Provisional application No. 60/157,594, filed on Oct. 4, 1999.

(51) Int. Cl.$^7$ .................................................. G06K 5/00
(52) U.S. Cl. ........................ 235/380; 235/376; 235/382; 235/476; 235/492; 705/417; 705/418
(58) Field of Search ................................ 235/380, 376, 235/382, 476, 492; 705/417, 418

(56) References Cited

U.S. PATENT DOCUMENTS

| 4,217,484 | A | * | 8/1980 | Gerst | 235/92 |
| 4,761,645 | A | * | 8/1988 | Mochida | 340/825.31 |
| 5,155,747 | A | * | 10/1992 | Huang | 377/16 |
| 5,293,160 | A | | 3/1994 | Kurozu | |
| 5,689,142 | A | * | 11/1997 | Liu | 307/10.5 |
| 5,723,911 | A | * | 3/1998 | Glehr | 307/10.2 |
| 5,751,073 | A | * | 5/1998 | Ross | 307/10.5 |
| 5,969,597 | A | | 10/1999 | Weigl | |

FOREIGN PATENT DOCUMENTS

| EP | 0897841 | 7/1998 |
| EP | 0924370 | 11/1998 |
| EP | 0924370 | 6/1999 |
| EP | 0984123 | 3/2000 |

OTHER PUBLICATIONS

PCT Search Report, dated Jan. 23, 2001.

* cited by examiner

*Primary Examiner*—Michael G. Lee
*Assistant Examiner*—Seung H. Lee

(57) ABSTRACT

A so-called "smart card" system is provided with controls which ensure that a request for change in status of a vehicle is not inconsistent with the presence or lack thereof of an appropriate card in the vehicle. As an example, prior to stopping ignition upon the request for stopping ignition, a sensor will look for the presence of a valid card within the vehicle cab. If no valid card is identified, then a warning signal is sent to the operator that no card is within the cab. This will prevent the operator from stopping the vehicle in the event that any appropriate cards have left the vehicle. The operator will thus be saved the inconvenience of having to walk to a location to get another card. In another example, should the request be for locking of the vehicle driver door, the presence of a valid card within the vehicle would be made known to the operator. In this way, the operator will be less likely to lock the card within the vehicle.

10 Claims, 2 Drawing Sheets

SMART CARD WITH CARD IN VEHICLE WARNING

This application claims priority to U.S. Provisional Application No. 60/157,594, filed Oct. 4, 1999.

BACKGROUND OF THE INVENTION

This application relates to improvements in so called smart card systems for detecting the presence of a card in a vehicle undergoing a change in status.

Historically, vehicles have been controlled by mechanical keys which are utilized to unlock doors and start the ignition of the vehicle. These devices typically require an operator to place the key into the key lock, turn the key lock, and control such as door unlock or ignition start are then actuated.

More recently, remote controls have been developed which actuate door locks, ignition start, and other functions, remotely through an RKE device upon actuation of a switch. These devices, known as keyfobs utilize a non-hard wire connection, such as an RF or LF connection. Vehicles incorporating the ability to communicate with such RKEs also typically have the ability to work with a mechanical key. These systems thus also require the use of some device which is actuated to request that a particular command be effected.

More recently, it has been proposed to have passive controls. The type of devices are known generically as "smart cards" and include a card carried by a user that authorizes the user to operate a particular vehicle. The card carries a coded signal which is checked by the vehicle computer to ensure that a proper operator for the vehicle is requesting the particular actuation. As an example, the card may have an LF transmitter/receiver, such as are commonly utilized in ignition lock systems. When in a vehicle, the operator merely requests that the vehicle be started. No key is used. Upon receiving the request to start the vehicle, a sensor within the vehicle searches for an appropriate key in the vehicle. If the operator is carrying an appropriate key, then the sensor communicates with the vehicle control to actuate a signal to start the vehicle. As one example, the card may have the ability to receive a challenge coded signal from the vehicle, and modify that signal in a certain fashion. The modified signal is then transmitted back to the vehicle. The vehicle can determine whether the card is appropriate based upon the modification to the signal. The card and the vehicle are programmed together, in a fashion which is well within the skill of a worker in this art.

While the basic concept of a smart card has promise, a number of practical realities and challenges still remain. One particular challenge relates to the fact that a user may very well forget that he is or is not carrying a card at any particular point in time. Since the card does not require any active manipulation to generate signals, the user may forget whether he is carrying the card.

As one example, if there are two people in a vehicle, and the passenger leaves the vehicle it may well be the passenger who is holding the appropriate card. That is, if a driver and passenger both enter a vehicle, the driver may not be holding the proper card, but rather the passenger is holding the card. The driver may have forgotten to bring the card. The vehicle would still start, however, since the passenger's card would be identified. If during the course of a trip the passenger leaves while the vehicle is still running (i.e., passenger dropped off at airport, etc.) the operator would be able to continue to operate the vehicle. However, if the operator stops after the passenger has left, and turns off the ignition, the operator would not be able to restart the vehicle.

Another example of a problem with passive cards occurs if the passive card is left at a location in the vehicle, such as on the dash, in a console, etc. The driver may then leave the vehicle, and the vehicle doors could be locked. Since the driver is not carrying the card, the driver would not be able to enter the car.

The present invention is directed to providing warnings to an operator should situations such as outlined above occur with a smart card system.

SUMMARY OF THE INVENTION

In a disclosed embodiment of this invention, a smart card system is provided with warnings to an operator when a card status in a vehicle may not be desirable given a requested action for the vehicle. In one embodiment, prior to turning off the ignition on a vehicle a sensor will check the interior of the vehicle to ensure that there is a proper card still within the vehicle. Thus, and as is outlined in the first example above, should the passenger have left the vehicle, and should the passenger be the one holding the appropriate card, the driver later asking for the ignition to be stopped would be provided with a warning that there is no valid card in the vehicle. If the driver has stopped at a spot on the way home, the driver would then have the opportunity to continue to drive the vehicle without turning off the ignition. A proper card could then be retrieved. In this way, the chance of a "walk home" situation for the driver would be avoided. In one example, a light and audio signal could be provided to the operator at the request of a ignition off if no proper card is sensed in the vehicle.

Similarly, if the operator leaves the vehicle, and a control senses that the door has been shut and a door lock has been requested, the sensor will check the interior of the vehicle to identify the presence of a card. If a card is sensed within the vehicle a warning signal is sent, such as an audio warning. This warning signal will allow the operator the opportunity to retrieve the card prior to the door locks being actuated.

These and other features of the present invention can be best understood from the following specification and drawings, the following of which is a brief description.

DETAILED DESCRIPTION OF A PREFERRED EMBODIMENT

Figure 1A:
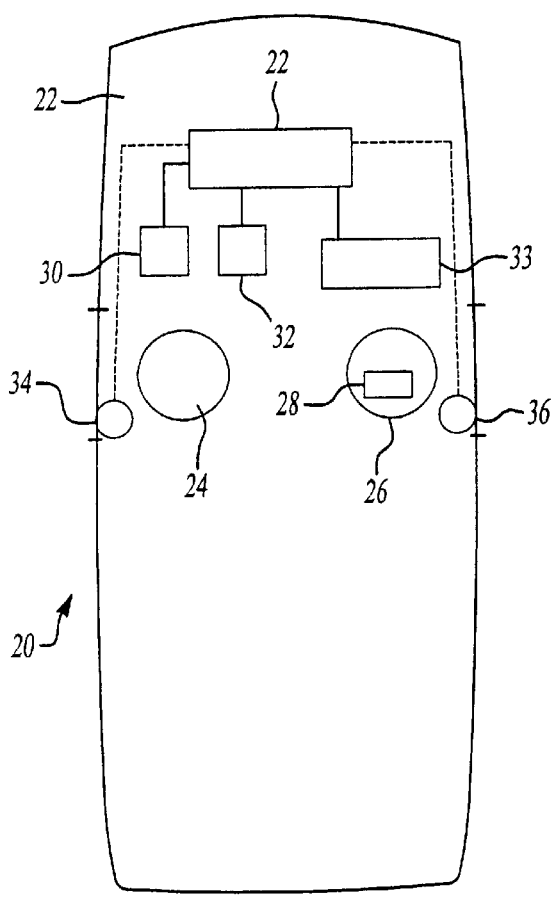
FIG. 1A is a schematic view showing a first situation addressed by the present invention.
Figure 1B:
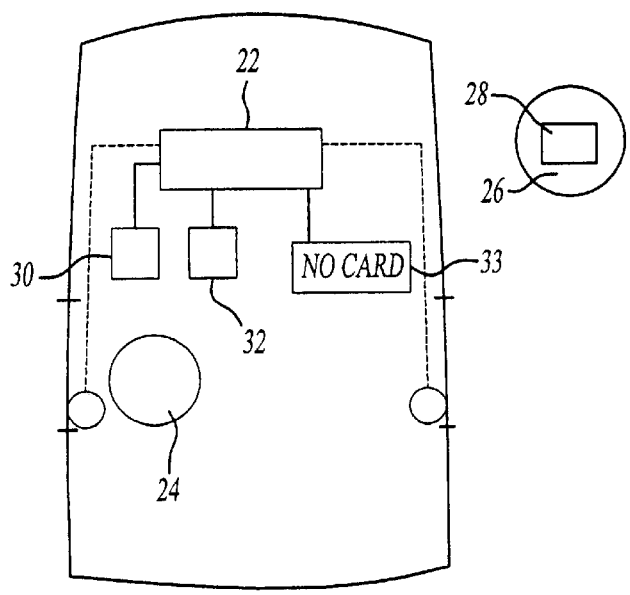
FIG. 1B shows a subsequent step in the first situation.

FIG. 1A shows a vehicle 20 incorporating a smart card system. As is known, a sensor and control 22 is placed within the cab of the vehicle. A driver 24 and a passenger 26 are shown within the cab. In the scenario of FIGS. 1A and 1B, the smart card 28 is held by the passenger 26. The driver 24 does not recognize that he did not bring his card with him. Since the passenger is holding a card, the control 22 will allow the vehicle to be started. As known, the vehicle would have a start button 30 and a stop button 32. Moreover, door lock controls 34 and 36 are also activated passively upon sensing of an appropriate card. The switches 30, 32, 34 and 36 are all simple actuation switches. No key is necessary to authorize the operation of these switches. This is one of the main benefits of effecting the smart key system. The several key lock mechanisms are no longer necessary.

As shown in FIG. 1B, the passenger 26 has now exited the vehicle. The driver 24 has not stopped the vehicle, such as a situation where the passenger is being dropped off. If the driver then drives to another location, and attempts to stop the vehicle by actuating the stop button 32, the sensor 22 will first check to ensure the presence of a valid card within the vehicle. That is, prior to actuating the appropriate steps to stop the vehicle, the sensor 22 will first search the cab of the vehicle for a proper card. If no proper card is identified, then a signal 33 is sent to the operator. This signal can be both visual and audio. The operator will then have to re-actuate the stop ignition button 32 for the vehicle to be stopped.

This system would thus provide the operator with the ability to not stop the vehicle in the event that the operator has forgotten his smart card. The present invention thus avoids the operator encountering a "walk home" situation.

Figure 2:
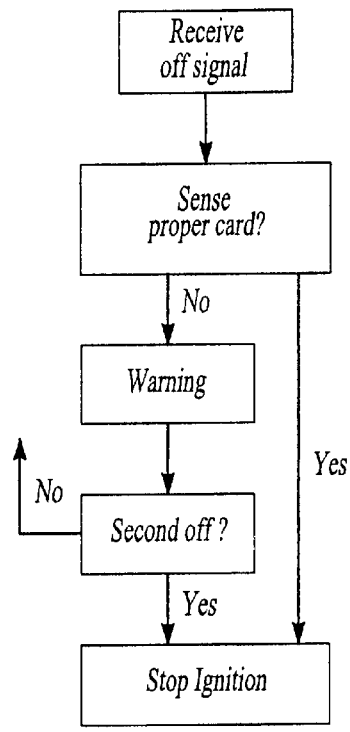
FIG. 2 is a flowchart of the first situation.

FIG. 2 is a flowchart of the FIG. 1 scenario. If an off request is received, the control will search the vehicle cab to identify the presence of a proper card. If a proper card is identified, then the ignition is stopped. If no proper card is identified, then a signal is sent. If a second request to stop is received, then the ignition is stopped.

Figure 3:
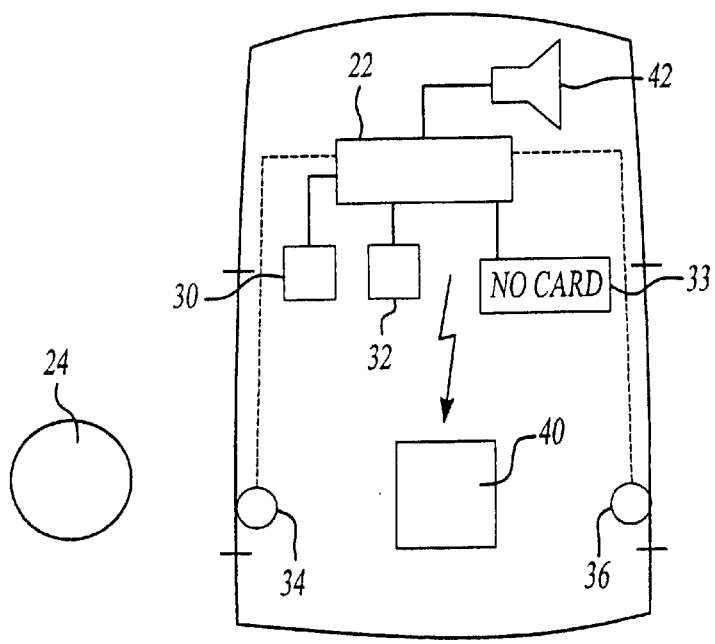
FIG. 3 shows a second situation.

FIG. 3 shows another scenario in which the control provides the operator with the ability of avoiding a potentially lock out undesirable situation. The operator 24 has left the vehicle but left the card 40 within the vehicle. Now, before the door 34 locks, as would typically be the case routinely once the door had been shut, the sensor 22 will scan the interior of the cab for an appropriate card. If an appropriate card 40 is sensed, then a signal is sent, such as by the visual warning 33, but also the audio warning 42 to identify the presence of the card 40 within the vehicle to the operator 24. The operator 24 will then be able to reopen the door 34, and retrieve the card 40. In the absence of such a signal, it is possible that the door 34 will be locked with the operator 24 outside the vehicle and the card 40 inside the vehicle. In such a situation the operator would be unable to reopen the door. By providing the warning signals, this system ensures that an operator will have the opportunity to retrieve a card prior to the door being locked.

Figure 4:
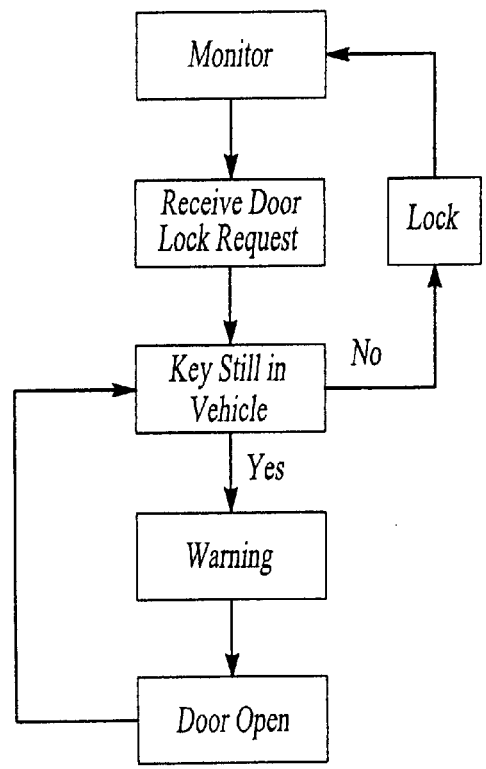
FIG. 4 is flowhart of the second situation.

As shown in FIG. 4, should a car door be closed, the control will initially search the cab for an appropriate card. If an appropriate card is found within the cab, then a warning will be actuated. If the operator then opens the door, the warning will be stopped.

More particularly, if a request is received to lock the vehicle doors, the system first checks to see whether the driver's door has been opened and closed within a predetermined period of time. This would provide an indication that the operator has left the vehicle. Once this has occurred, the control searches for the presence of a key within the vehicle. If no key is sensed, then the system returns to its steady state operation and the doors are locked. However, if a key is sensed, then a short period warning is sent. If the door is opened during this short warning period, then the system will again search for the presence of a key. If the key is no longer sensed, then the doors are locked. However, if a key is still sensed, then the warning will be sent again. The system can either continue to send the warning until either a second actuation of the door lock is manually received, or until a period of time has ended.

These aspects of the control have been disclosed in one preferred embodiment. A worker in this art would recognize that many other embodiments and forms of providing these benefits would come within the scope of this invention. For that reason the following claims should be studied to determine the true scope and content of this invention.

What is claimed is:

1. A method of operating a vehicle comprising the steps of:

1) providing a card carrying a passive code for authorizing operation of the vehicle, and providing a sensor on the vehicle;

2) searching for presence of a proper card within a cab of a vehicle, and authorizing operation of the vehicle when the presence of a proper card is sensed;

3) receiving a signal relative to a change in status of the vehicle, said status request change being a request to stop ignition of the vehicle;

4) checking for the presence of a proper authorized card in the vehicle upon the receipt of signal at step 3; and 5) providing a warning to an operator should a status change requested in step 3 be inconsistent with the card in vehicle information of step 4, and in particular, actuating said warning if no proper card is sensed within the vehicle at step 4.

2. A method as set forth in claim 1, wherein a signal is sent to the operator in the event that a request to stop the ignition is received and no card is identified in the cab and the ignition is not stopped unless a second request for stopping ignition is received.

3. A method as set forth in claim 1, wherein the status request is the locking of a door, and the warning of step 5 occurs when the presence of an appropriate card is sensed within the cab.

4. A method as set forth in claim 3, wherein an audio warning is sent to an operator to allow the operator to be made aware of the presence of an appropriate card in the vehicle prior to the door lock being completed.

5. A vehicle control system comprising:

a sensor for sensing a presence of an appropriate card within a cab of a vehicle;

a card provided with a code to be sensed by said sensor;

at least one vehicle system to be operated upon a request from an operator, and said sensor communicating with a control authorizing operation of said at least one system; and said control being operable upon receiving a request for a change in status of said at least one system to check for the presence of an authorized card within the cab of a vehicle receiving said system, said control providing a warning to an operator should a request for a change in status of the vehicle system be inconsistent with the results of the sensing for an appropriate card, said system being a vehicle ignition, and a warning signal being sent to an operator when a request for stopping the ignition is received and no appropriate card is identified in the vehicle.

6. A system as set forth in claim 5, wherein the vehicle ignition is not stopped until a second actuation of the request for vehicle ignition stop is received after the warning signal.

7. A system as set forth in claim 5, wherein the system also includes the vehicle door locks.

8. A system as set forth in claim 7, wherein if a request for door locks is received, then the system senses for the presence of a card within the vehicle, and if a card is sensed within the vehicle, then a warning signal is sent.

9. A system as set forth in claim 6, wherein the system is the door locks.

10. A system as set forth in claim 9, wherein the request for change in status is the locking of a door, the system is the door locks, and the warning is sent if an appropriate card is still sensed in the vehicle.

* * * * *